Feb. 6, 1934.  H. ARNI  1,945,586
MANUFACTURING GOFFERING CYLINDERS FOR ENGRAVING
LENTICULAR ELEMENTS ON FILMS
Filed June 7, 1932
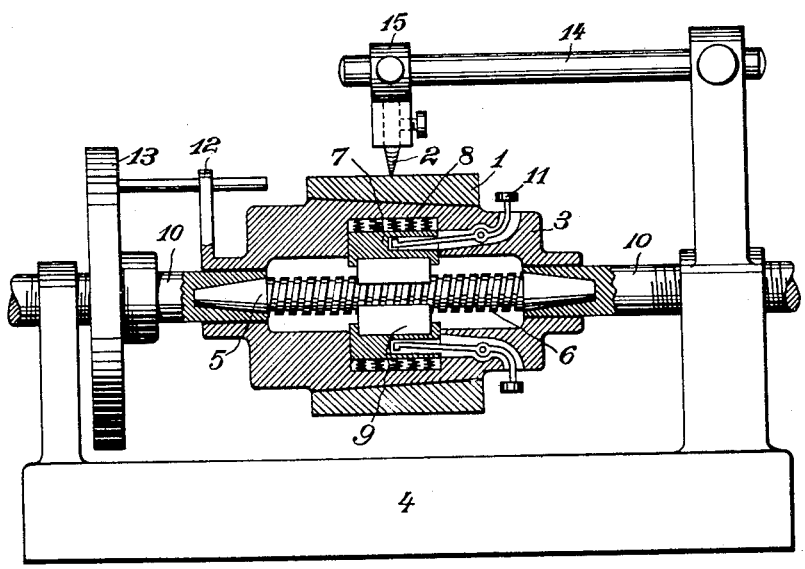
INVENTOR
Hans Arni
BY
Gifford, Scull & Burgess
ATTORNEYS Patented Feb. 6, 1934

1,945,586

UNITED STATES PATENT OFFICE 1,945,586

MANUFACTURING GOFFERING CYLINDERS FOR ENGRAVING LENTICULAR ELEMENTS ON FILMS

Hans Arni, Falkensee, near Berlin, Germany, assignor to Siemens & Halske, Aktiengesellschaft, Siemensstadt, near Berlin, Germany, a corporation of Germany Application June 7, 1932, Serial No. 615,921, and in Germany June 9, 1931

6 Claims. (Cl. 82—5)

The invention refers to a new device for manufacturing goffering cylinders designed to engrave small cylindrical lenses on the celluloid of photographic film slips. Such films are used for producing coloured reproductions, stereoscopic pictures or for similar purposes. The lenticular elements are so dimensioned that their focal distances are approximately equal to the thickness of the celluloid layer and their sharp edges are adjacent to one another without an intervening space. In order to obtain faultless pictures, the lenses must be as much as possible perfect optical structures.

The object of the invention is to create a device which permits of producing, on a goffering cylinder, an exact spiralled engraving of extreme fineness.

Another object is to enable the device to produce the lenticular elements with extreme uniformity, independently of fluctuations in temperature.

Mention must furthermore be made of the object of the invention to treat the goffering cylinder several times successively, so as to enable the lenticular elements to be materially improved with respect to smoothness and shape.

Further advantages of the object of the invention will be explained in the following description.

According to the invention, devices for producing goffering cylinders have their guides arranged within the cylinder. In this manner the distance between the guide and the tool working on the roller has a component, measured in the direction of the axis, which is kept short.

The figure shows a constructional example of the new devices. 1 designates the goffering cylinder, on which a spiralled groove is engraved by means of a tool here shown as a diamond 2. The diamond is clamped to the arm 14 which is firmly screwed to the supporting device 15. The goffering cylinder is conically fitted on a metal block 3. The guiding is achieved with the aid of the spindle 5 clamped to the rack 4 by means of the shafts 10. This spindle has (at 6) a thread whose pitch is exactly in accordance with that of the spiral to be impressed on the roller. The blocks 7 which carry the guide pieces 9 of soft material are sunk into the drum 3 so as to enable them to be pressed against the thread of the spindle 5 by means of the springs 8. This guarantees a completely exact guiding of the drum 3 in the axial direction. An exact guiding of the drum also in the radial direction is secured by means of the shafts 10. The levers 11 enable the drum 3 to be easily removed from the spindle.

In order to engrave the roller the diamond 2 is made to touch it with constant pressure. The roller is then turned with the aid of the striker 12 and the driver shaft 13, so as to be simultaneously displaced in the axial direction according to the pitch of the thread of the guiding spindle, for instance from the left to the right. One thus obtains a spiral of strictly equal pitch on the roller.

In the constructional example shown in the figure, the diamond is arranged in such a manner that it is exactly above the guide of the roller when half of the roller has been treated. The greatest distance which is obtained between guide and impressing tool when engraving the spiral, has a component in the axial direction which is approximately equal to half the width of the goffering cylinder. In order fully to utilize the advantage obtainable by means of the new device, this component should not be made greater than the width of the roller and, in order to equalize the variations in the position of the roller occurring due to fluctuations in temperature, also for these small dimensions, the parts arranged between the guide and the impressing tool, for instance the spindle 5, should preferably be made of material having a small coefficient of thermic expansion. In addition, the support of the diamonds, for instance the arm 14, should be manufactured of material with the same coefficient of expansion.

Such a device not only compensates for the objectionable fluctuations in temperature, but also offers the advantage that a slight play of the device transporting the cylinder results only in a slight inaccuracy of the depth of the spiral, so that the pivot suspension of the roller does not act appreciably on the quality of the roller, as contrasted with the devices used up to the present. The drive of the cylinder can thereby be achieved in any way whatever.

I claim:

1. A device for manufacturing goffering cylinders for engraving lenticular elements on photographic and cinematographic films comprising a spindle arranged within said cylinder, guide-pieces engaging said spindle, and cooperating elements on said guide-pieces and the spindle controlling the motion of the cylinder, said guide-pieces being carried by blocks, sunk into a drum, on which the cylinder is conically fitted.

2. A device for manufacturing goffering cylinders for engraving lenticular elements on photographic and cinematographic films comprising a spindle arranged within said cylinder guide-pieces engaging said spindle, and cooperating elements on said guide-pieces and the spindle controlling the motion of the cylinder, said guide-pieces being pressed against the spindle by means of springs.

3. A device for manufacturing goffering cylinders for engraving lenticular elements on films comprising a block adapted to support a cylinder, a spindle extending within said block, cooperating elements carried by the spindle and the block, respectively, and disposed between the opposite ends of the cylinder when mounted on the block, means for supporting a tool in position to act on said cylinder, and means for causing relative movement of said tool and block about the axis of the spindle and lengthwise thereof.

4. A device for manufacturing goffering cylinders for engraving lenticular elements on films comprising a block adapted to support a cylinder, a spindle extending within said block, cooperating elements carried by the spindle and the block, respectively, and disposed approximately centrally between the opposite ends of the cylinder when mounted on the block, means for supporting a tool in position to act on said cylinder, and means for causing relative movement of said tool and block about the axis of the spindle and lengthwise thereof.

5. A device for manufacturing goffering cylinders for engraving lenticular elements on films comprising a block adapted to support a cylinder, a spindle extending within said block, cooperating elements carried by the spindle and the block, respectively, and disposed between the opposite ends of the cylinder when mounted on the block, means for supporting a tool in position to act on said cylinder, means for causing relative movement of said tool and block about the axis of the spindle and lengthwise thereof, and means resiliently holding said elements in engagement.

6. A device for manufacturing goffering cylinders for engraving lenticular elements on films comprising a block adapted to support a cylinder, a spindle extending within said block, cooperating elements carried by the spindle and the block, respectively, and disposed between the opposite ends of the cylinder when mounted on the block, means for supporting a tool in position to act on said cylinder, and means for causing relative movement of said tool and block about the axis of the spindle and lengthwise thereof, the guide elements on the block being made of relatively soft material.

HANS ARNI.